Sept. 27, 1966                J. ONEY                3,274,726

WEED GUARD FOR TREBLE HOOK

Filed Nov. 6, 1964

INVENTOR.
JOHN ONEY
BY William Cleland
ATTORNEY

United States Patent Office 3,274,726
Patented Sept. 27, 1966

3,274,726
WEED GUARD FOR TREBLE HOOK
John Oney, 5872 Woodward Drive, Akron, Ohio
Filed Nov. 6, 1964, Ser. No. 409,492
7 Claims. (Cl. 43—43.4)

This invention relates to fishing lures, and in particular relates to a weed guard for a treble hook.

Heretofore, various types of weed guards have been provided for treble hooks, usually including a hub portion mounted on the shank of the treble hook and having arms extending into position to overlie the pointed ends of the hook. Such prior art devices have been generally difficult to mount on hook shanks and had no reliable means for preventing the devices from turning on the shanks and/or slipping longitudinally of the shanks. Accordingly the prior devices could not be depended upon to maintain the guard arms of the respective hooks in functionally proper relationship to the hook ends. Past attempts to overcome this problem have generally resulted in increasing the costs for producing the weed guards and/or assembling the same on a hook shank.

An object of the present invention is to provide an improved weed guard and treble hook combination in which the weed guard is easily manually operable to position it on the hook shank, and in which the weed guard will be substantially securely locked against rotational and longitudinal movement on the hook shank without interfering with full use of the hook eye.

Another object of the invention is to provide a weed guard of the character described having improved hook point engaging means on the guard arms which will not be easily triggered by action of water, but will rather deflect the weeds away from the hook ends, and yet which will be easily triggered by a fish taking a wider bite and thereby tending to take a firmer clamping grip over the hook ends.

These and other objects of the invention will be manifest from the following brief description and the accompanying drawings.

Figure 1:
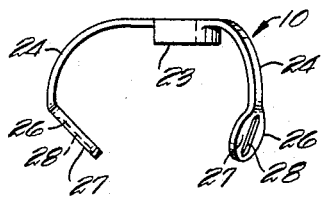
FIGURE 1 is a side elevation of a weed guard embodying the features of the invention.
Figure 2:
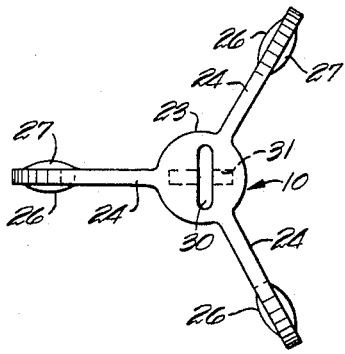
FIGURE 2 is an enlarged top plan view of the same.
Figure 3:
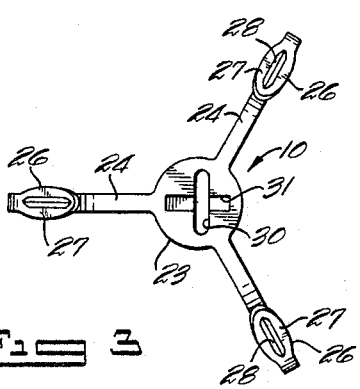
FIGURE 3 is a bottom plan view of FIGURE 1, on the same scale as FIGURE 2.
Figure 5:
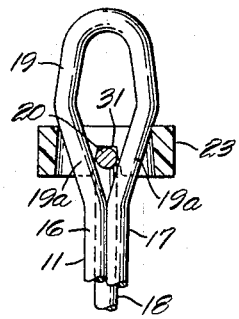
FIGURE 5 is a fragmentary, vertical cross-section, taken substantially on the line 5—5 of FIGURE 4.
Figure 4:
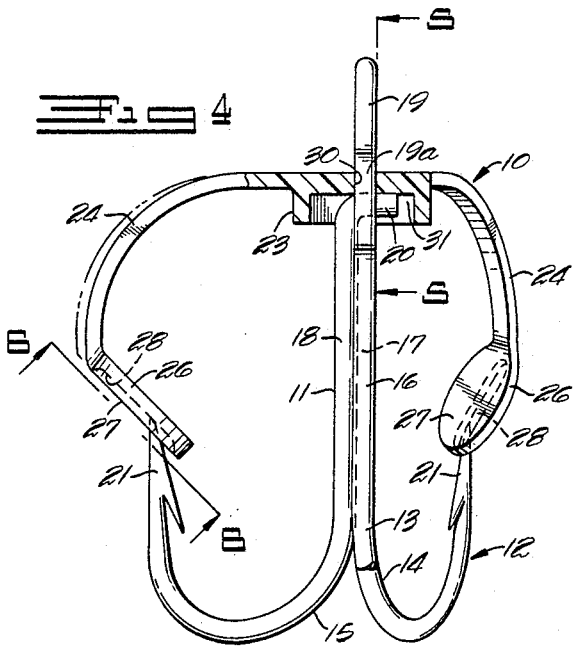
FIGURE 4 is a greatly enlarged side elevation corresponding to FIGURE 1, mounted on a treble hook, the weed guard being partly broken away and in section to show the manner of attachment to the shank of the hook.
Figure 6:
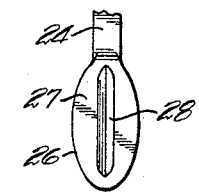
FIGURE 6 is a fragmentary view of a hook-point engaging end of one of the guard arms of the weed guard, substantially as viewed on the line 6—6 of FIGURE 4.

Referring to the drawings generally and to FIGURES 4 and 5 in particular, the numeral 10 designates a one-piece weed guard (see FIGURES 1 to 3) mounted on the shank 11 of a treble hook 12 (see FIGURE 4). The treble hook 12 is of known general type composed of three fishhooks 13, 14 and 15 having elongated wire shanks 16, 17 and 18, soldered or otherwise affixed to each other to form the treble shank 11. Two wire shanks 13 and 14 are connected as shown in FIGURE 5, to form a loop-shaped eye 19, at the terminal end of the shank 11, the inner portions of the eye having convergent sides 19a, 19a between which a terminal end of wire shank 18 is outturned to provide a radial protrusion or locking portion 20, for purposes to be described later. The hooks 13, 14 and 15 have the usual inturned barbed ends 21, 21.

The weed guard 10 may be molded hard, but inherently resilient synthetic resin plastic, such as acetol resin, including a small disc-like hub 23, and a plurality of peripherally spaced, somewhat slender yieldingly flexible arms 24, 24 which are integral with the hub, and which arch radially outwardly and axially away from the hub. Each arm 24 may be formed with an enlarged terminal portion 26 having a flat radially outwardly presented face 27 in a plane at a radially inwardly convergent angle to said axis, in a direction away from the hub. Each outwardly presented face 27 may have therein an elongated recess 28 of V-shaped cross-section, for protective reception of a corresponding hook point, in a manner and for purposes to be described later.

Hub 23 may be provided with a diametrically elongated slot 30 extending axially therethrough, for forcible yielding reception of the eye 19 of the treble hook, to project beyond the outer face of the hub until the hub contracts against the inwardly convergent portions 19a of the eye, thereby effecting stop means preventing reverse movement of the treble hook. In this stop position of the eye the locking protrusion 20 will be snugly received to full depth within a shallow groove 31, in the inner side of the hub, at right angles or cross-wise with respect to slot 30, to prevent further outward movement of the eye 10 through the slot, and to retain the eye tightly against the ends of the slot. In addition, the protrusion locks the weed guard against rotation on the hook shank 11, in a fixed position in which the arms 24 are radial planes including the axis of shank 11 and the points of the corresponding barbed ends 21, as best shown at the left of FIGURE 4. In this locked position the hook points will be in full contact with the bottoms of the recesses 28, against the yielding resistance of the arms 24.

In use of the combination treble hook and weed guard on a line in known manner, the curved arms 24 extend radially beyond the hook points a substantial distance, as shown at the left of FIGURE 4, for deflecting weeds away from the hooks. At the same time, resultant flexure of the arms toward the shank 11, by such weeds will, to a certain extent, be prevented by corresponding increase in yielding pressure of the terminal portions 26 against the hook points, depending upon the aforesaid angle of the face 27 to the axis of shank 11. FIGURE 4 illustrates this angle as being approximately forty-five degrees. In any event, the arrangement is such that the arms tend normally to retain the positions thereof shown in full lines in FIGURE 4 when the device is drawn through weeds in the water. When, however, a fish strikes the device and encompasses the curved arms 24 in its mouth, the tendency will then be to compress the arms radially inwardly of the shank 11 to expose the hook points to engagement with jaw portions of the fish. If the fish is not caught the arms are returned toward self-centering engagement of the hook points in the V-shaped grooves 28 of said terminal portions 26.

The weed guard is adapted to be furnished by the manufacturer in combination with the treble hook as described, or to be quickly attached to the hook shank by the fisherman, in which case locking protrusion 20 in groove 31 assures accurate positioning of the arms 24 with respect to the corresponding hook points.

Acetol resins suitable for the molded weed guard are manufactured by the DuPont Company under brand name "Delrin" and by Celanese Corporation under the brand name "Cellon." Another material which may be used for this purpose is nylon.

Modifications of the invention may be resorted to without departing from the spirit thereof or the scope of the appended claims.

What is claimed is:

1. A weed guard for a treble hook having a shank terminating in an eye and provided with a transverse locking portion inwardly closely adjacent the eye, comprising: a hub having a central axis; said hub having axially opposite, outer and inner sides, and being of relatively hard but somewhat resilient synthetic resin plastic; said hub having a diametrically elongated slot extending axially therethrough and a groove of less depth than the thickness of the hub in said inner side of same and cross-wise of the slot to communicate therewith at the central portion of the hub; whereby the eye of the hook is yieldingly forcibly insertible axially through the slot to project outwardly of said outer side and engage said locking portion in said groove, thereby to prevent relative rotation of the hub with respect to the shank and whereby a widening portion of the eye overhangs and engages the ends of the slot to prevent axial retraction of the eye from the hub; said hub having integral, resiliently flexible, radial arms having terminal portions for yielding engagement with the hook points inwardly thereof; said flexible arms having outwardly arched portions intermediate said terminal portions and the hub to overhang the hook points, for deflecting weeds away from the points.

2. A weed guard as in claim 1, each said terminal portion having a radially outwardly presented face extending at a radially inwardly convergent angle to said axis in direction away from the hub.

3. A weed guard as in claim 2, each said face having a recess provided with convergent surfaces for guiding the hook points to peripherally centered positions of the respective arms upon said yielding engagement of the hook points.

4. The combination with a treble hook including an axially extending shank terminating in a loop-shaped eye and provided adjacent the eye with a fixed, radially out-turned protrusion; of a one-piece weed guard of hard but inherently resilient material including a central hub having axially spaced inner and outer sides; said hub having a diametrically elongated slot extending axially therethrough and a groove of less depth than the thickness of the hub in said inner side of same and cross-wise of the slot to communicate therewith at the central portion of the hub; said eye of the hook being axially received through said slot to project outwardly of said outer side of the hub with a widening inner portion of the eye overhanging and engaging the ends of the slot, and said protrusion is engaged in said groove, whereby said hub is affixed against movement on the shank in any direction; integral, resiliently flexible, radial arms on said hub having terminal portions presented closely adjacent the respective hook points; said flexible arms having outwardly arched portions intermediate said terminal portions and the hub to overhang the hook points, for deflecting weeds away from the points.

5. A combination as in claim 4, each said terminal portion having a radially outwardly presented face extending at a radially inwardly convergent angle to said axis in direction away from the hub.

6. A weed guard as in claim 5, each said face having a recess provided with convergent surfaces for guiding the hook points to peripherally centered positions of the respective arms upon said yielding engagement of the hook points.

7. A weed guard for a treble hook having a shank terminating in an eye and provided with a transverse locking portion inwardly closely adjacent the eye, comprising: a hub having a central axis; said hub having axially opposite, outer and inner sides, and being of relatively hard but somewhat resilient synthetic resin plastic; said hub having a slot extending axially therethrough and a groove of less depth than the thickness of the hub in the inner side of the same and cross-wise of the slot to communicate therewith at the central portion of the hub; whereby the eye of the hook is yieldingly forcibly insertible through the slot to project outwardly of said outer side and engage said locking portion of the hook in said groove and prevent relative rotation of the hub on the hook shank; said hub having integral, resiliently flexible, radial arms provided with terminal portions for yielding engagement with the hook points inwardly thereof; said flexible arms having outwardly arched portions intermediate said terminal portions and the hub to overhang the hook points, for deflecting weeds away from the points; said terminal portions being inturned with respect to said arched portions thereof, by which action of the weeds on the latter tends to apply non-slip pressure between the terminal portions and the hook points, thereby to prevent radially inward movement of the terminal portions away from the points, but by which a fish gripping the radial arms between the jaws of the fish will cause radially inward movement of the terminal portions with the arms to expose the hook points to engagement thereof in the jaws of the fish.

References Cited by the Examiner

UNITED STATES PATENTS

| | | | |
|---|---|---|---|
| 539,149 | 5/1895 | Shattuck | 43—42.1 |
| 2,586,162 | 2/1952 | Hayden | 43—43.6 |
| 2,913,849 | 11/1959 | Rolstone | 43—42.41 |

SAMUEL KOREN, *Primary Examiner.*

D. J. LEACH, *Assistant Examiner.*